US012063626B2

(12) United States Patent
Zhou et al.

(10) Patent No.: US 12,063,626 B2
(45) Date of Patent: Aug. 13, 2024

(54) INDICATING FULL DUPLEX USE OF RESERVED SIDELINK RESOURCES

(71) Applicant: QUALCOMM Incorporated, San Diego, CA (US)

(72) Inventors: Yan Zhou, San Diego, CA (US); Qian Zhang, Basking Ridge, NJ (US); Sony Akkarakaran, Poway, CA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 17/450,632

(22) Filed: Oct. 12, 2021

(65) Prior Publication Data

US 2023/0110549 A1    Apr. 13, 2023

(51) Int. Cl.
| | |
|---|---|
| *H04W 4/00* | (2018.01) |
| *H04L 1/00* | (2006.01) |
| *H04L 5/14* | (2006.01) |
| *H04W 72/02* | (2009.01) |
| *H04W 72/0446* | (2023.01) |
| *H04W 72/0453* | (2023.01) |
| *H04W 72/20* | (2023.01) |

(52) U.S. Cl.
CPC .......... *H04W 72/02* (2013.01); *H04L 1/0003* (2013.01); *H04L 5/14* (2013.01); *H04W 72/0446* (2013.01); *H04W 72/0453* (2013.01); *H04W 72/20* (2023.01)

(58) Field of Classification Search
CPC . H04W 72/02; H04W 72/20; H04W 72/0446; H04W 72/0453; H04L 1/0003; H04L 5/14
See application file for complete search history.

(56) References Cited

U.S. PATENT DOCUMENTS

| | | | |
|---|---|---|---|
| 2016/0239801 A1* | 8/2016 | Burch, V | ........... G06Q 10/0838 |
| 2018/0212746 A1* | 7/2018 | Kazmi | ....................... H04L 5/14 |
| 2019/0082454 A1* | 3/2019 | Shi | ........................ H04W 72/20 |
| 2019/0089502 A1* | 3/2019 | Yi | ........................ H04W 16/14 |
| 2019/0191452 A1* | 6/2019 | Pelletier | ................ H04L 1/1822 |
| 2020/0098238 A1* | 3/2020 | Skaaksrud | .............. H04W 4/38 |
| 2020/0146006 A1 | 5/2020 | Yoon | |
| 2020/0154404 A1* | 5/2020 | Göktepe | ............... H04L 5/0053 |

(Continued)

FOREIGN PATENT DOCUMENTS

| | | | |
|---|---|---|---|
| WO | 2022170622 | 8/2022 | |
| WO | WO-2022170622 A1 * | 8/2022 | .......... H04W 72/046 |

OTHER PUBLICATIONS

International Search Report and Written Opinion—PCT/US2022/076467—ISA/EPO—Dec. 1, 2022.

*Primary Examiner* — Edan Orgad
*Assistant Examiner* — Hidayat Dabiri
(74) *Attorney, Agent, or Firm* — Arun Swain

(57) ABSTRACT

Various aspects of the present disclosure generally relate to wireless communication. In some aspects, a user equipment (UE) may select a plurality of resources for a sidelink transmission. The UE may transmit an indication that one or more resources, of the plurality of resources, that are reserved by the UE for the sidelink transmission, may be used by a different UE for a transmission for full duplex communication. Numerous other aspects are described.

30 Claims, 12 Drawing Sheets

(56) References Cited

U.S. PATENT DOCUMENTS

| | | | |
|---|---|---|---|
| 2020/0396599 A1* | 12/2020 | Luo | H04W 4/46 |
| 2021/0028891 A1* | 1/2021 | Zhou | H04W 4/40 |
| 2021/0084632 A1* | 3/2021 | Liu | H04W 72/23 |
| 2021/0219268 A1* | 7/2021 | Li | H04W 72/20 |
| 2022/0061040 A1* | 2/2022 | Fong | H04W 72/20 |
| 2023/0379912 A1* | 11/2023 | Ji | H04W 72/20 |

\* cited by examiner

INDICATING FULL DUPLEX USE OF RESERVED SIDELINK RESOURCES

FIELD OF THE DISCLOSURE

Aspects of the present disclosure generally relate to wireless communication and to techniques and apparatuses for indicating full duplex use of reserved sidelink resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include selecting a plurality of resources for a sidelink transmission. The method may include transmitting an indication that one or more resources, of the plurality of resources, that are reserved by the UE for the sidelink transmission, may be used by a different UE for a transmission for full duplex communication.

Some aspects described herein relate to a method of wireless communication performed by an apparatus of a UE. The method may include receiving an indication that one or more resources reserved by a different UE for a sidelink transmission may be used by the UE for a transmission for full duplex communication. The method may include communicating on a sidelink using the one or more resources based at least in part on the indication.

Some aspects described herein relate to an apparatus for wireless communication at a UE. The apparatus may include a memory and one or more processors coupled to the memory. The one or more processors may be configured to select a plurality of resources for a sidelink transmission. The one or more processors may be configured to transmit an indication that one or more resources, of the plurality of resources, that are reserved by the UE for the sidelink transmission, may be used by a different UE for a transmission for full duplex communication.

Some aspects described herein relate to an apparatus for wireless communication at a UE. The apparatus may include a memory and one or more processors coupled to the memory. The one or more processors may be configured to receive an indication that one or more resources reserved by a different UE for a sidelink transmission may be used by the UE for a transmission for full duplex communication. The one or more processors may be configured to communicate on a sidelink using the one or more resources based at least in part on the indication.

Some aspects described herein relate to a non-transitory computer-readable medium that stores a set of instructions for wireless communication by a UE. The set of instructions, when executed by one or more processors of the UE, may cause the UE to select a plurality of resources for a sidelink transmission. The set of instructions, when executed by one or more processors of the UE, may cause the UE to transmit an indication that one or more resources, of the plurality of resources, that are reserved by the UE for the sidelink transmission, may be used by a different UE for a transmission for full duplex communication.

Some aspects described herein relate to a non-transitory computer-readable medium that stores a set of instructions for wireless communication by a UE. The set of instructions, when executed by one or more processors of the UE, may cause the UE to receive an indication that one or more resources reserved by a different UE for a sidelink transmission may be used by the UE for a transmission for full duplex communication. The set of instructions, when executed by one or more processors of the UE, may cause the UE to communicate on a sidelink using the one or more resources based at least in part on the indication.

Some aspects described herein relate to an apparatus for wireless communication. The apparatus may include means for selecting a plurality of resources for a sidelink transmission. The apparatus may include means for transmitting an indication that one or more resources, of the plurality of resources, that are reserved by the apparatus for the sidelink transmission, may be used by a different UE for a transmission for full duplex communication.

Some aspects described herein relate to an apparatus for wireless communication. The apparatus may include means for receiving an indication that one or more resources reserved by a UE for a sidelink transmission may be used by the apparatus for a transmission for full duplex communication. The apparatus may include means for communicating on a sidelink using the one or more resources based at least in part on the indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
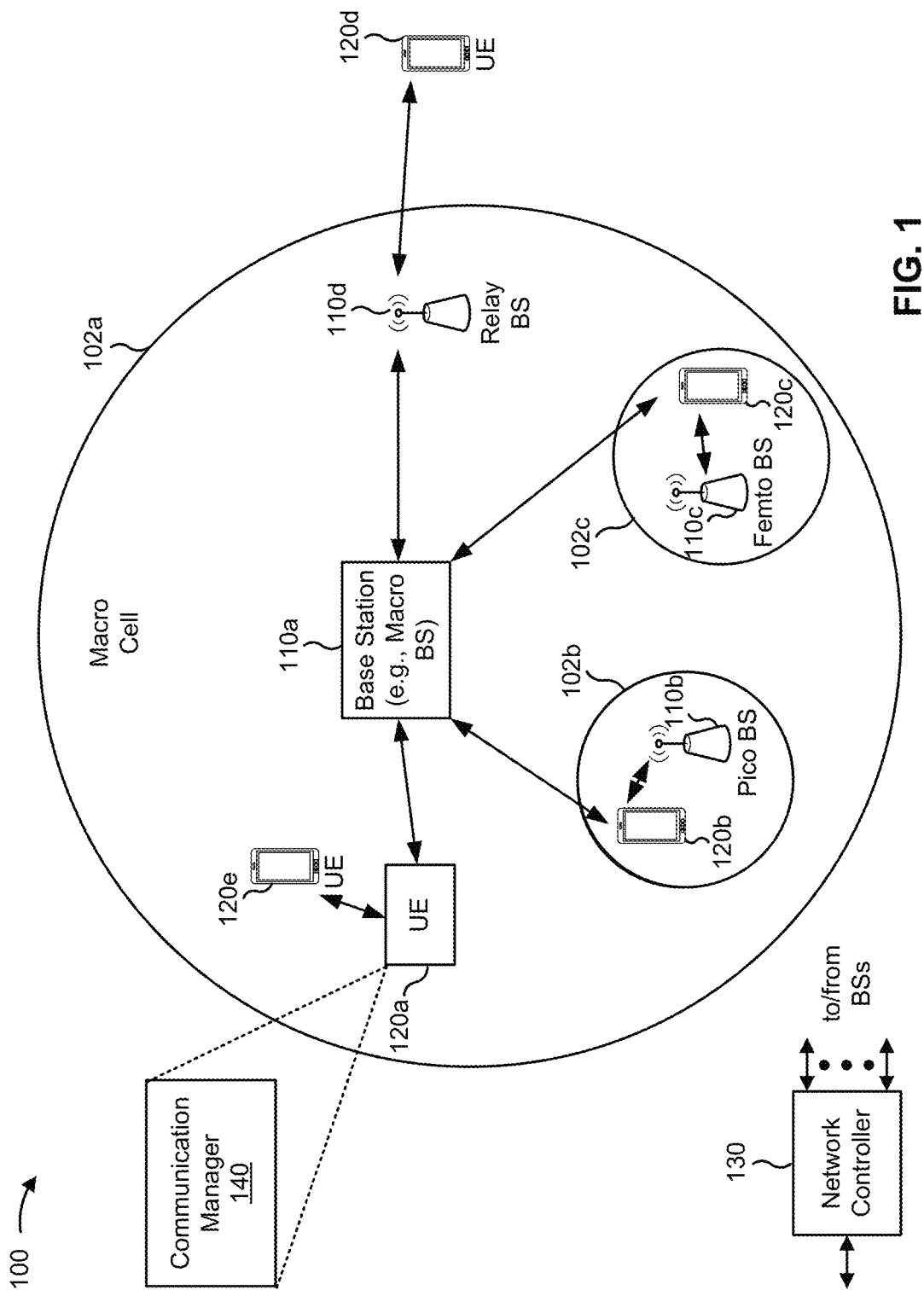
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may select a plurality of resources for a sidelink transmission; and transmit an indication that one or more resources, of the plurality of resources, that are reserved by the UE for the sidelink transmission, may be used by a different UE for a transmission for full duplex communication. Additionally, or alternatively, the communication manager 140 may receive an indication that one or more resources reserved by a different UE for a sidelink transmission may be used by the UE for a transmission for full duplex communication; and communicate on a sidelink using the one or more resources based at least in part on the indication. Additionally, or alternatively, the communication manager 140 may perform one or more other operations described herein.

As indicated above, FIG. 1 is provided as an example. Other examples may differ from what is described with regard to FIG. 1.

Figure 2:
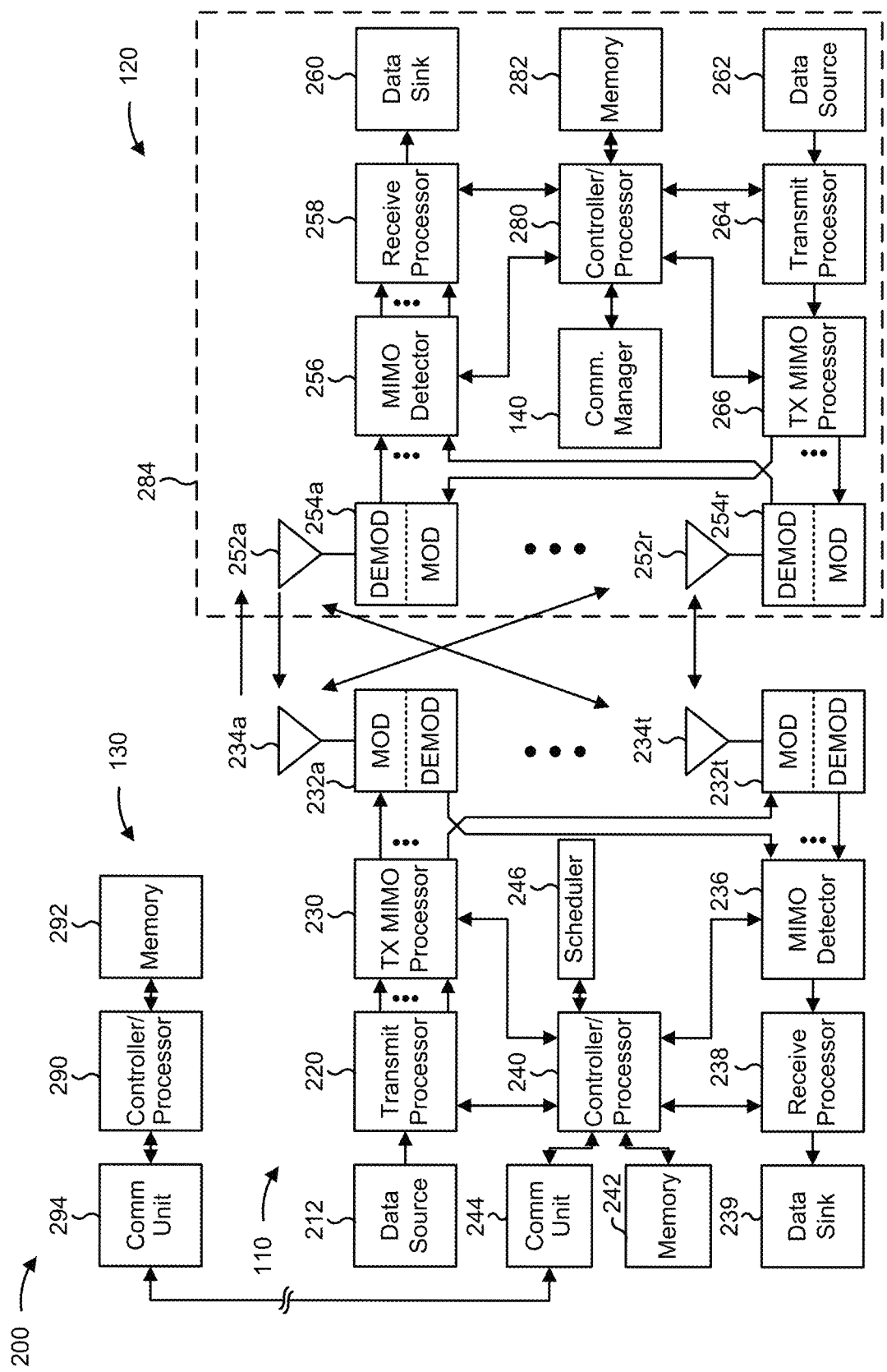
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the base station 110, the controller/processor 280 of the UE 120, and/or any other component(s) of FIG. 2 may perform one or more techniques associated with indicating full duplex use of reserved sidelink resources, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for selecting a plurality of resources for a sidelink transmission; and/or means for transmitting an indication that one or more resources, of the plurality of resources, that are reserved by the UE 120 for the sidelink transmission, may be used by a different UE 120 for a transmission for full duplex communication. In some aspects, the UE 120 includes means for receiving an indication that one or more resources reserved by a different UE 120 for a sidelink transmission may be used by the UE 120 for a transmission for full duplex communication; and/or means for communicating on a sidelink using the one or more resources based at least in part on the indication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
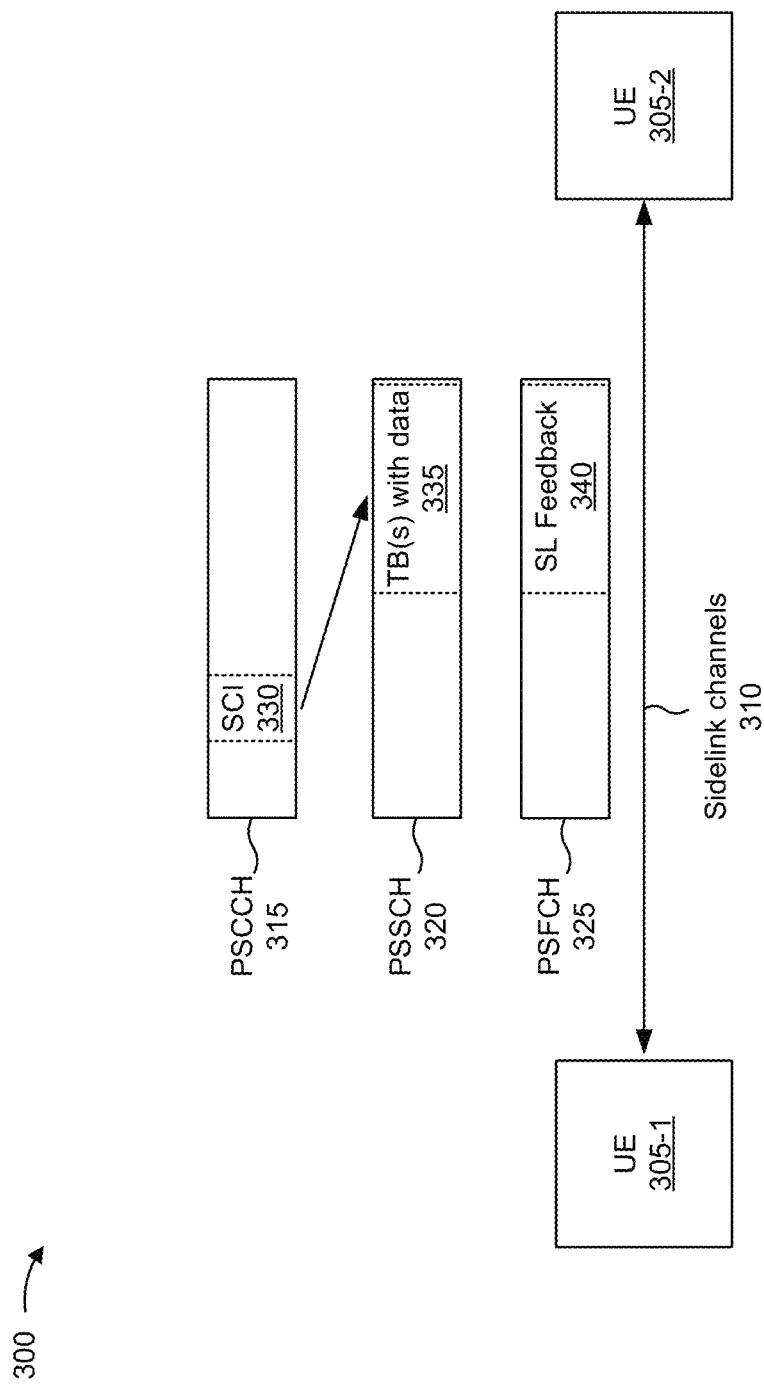
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
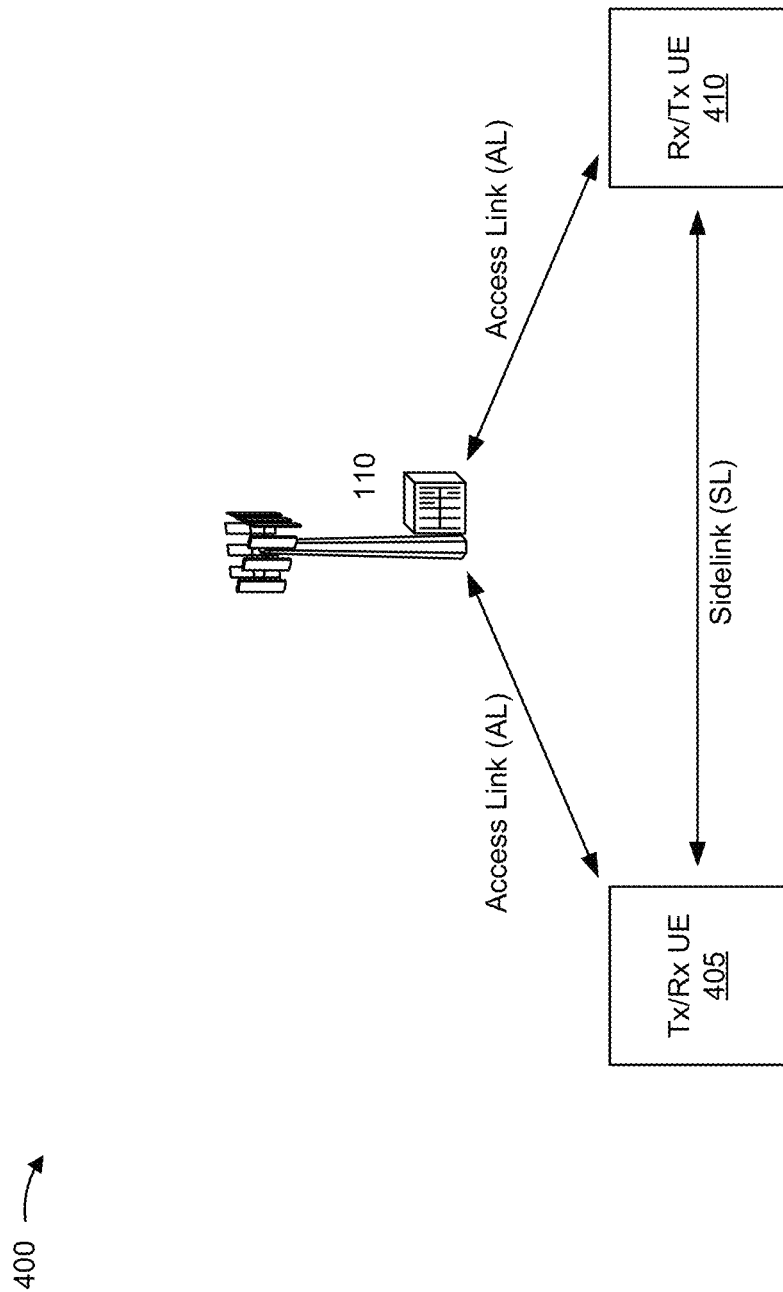
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
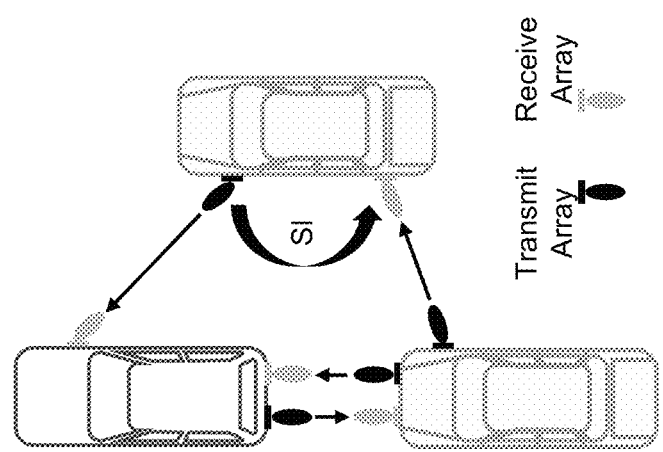
FIG. 5 is a diagram illustrating an example of spatial isolation of antenna panels, in accordance with the present disclosure.

FIG. 5 is a diagram illustrating an example 500 of spatial isolation of antenna panels, in accordance with the present disclosure. Spatial isolation between a transmit antenna panel or array and a receive antenna panel or array may reduce self-interference (e.g., interference of a reception by a device due to a transmission by the device) associated with full duplex communication (e.g., transmission and reception at a device overlapping in time). In V2X, the size of a vehicle or a roadside unit (RSU) may provide enough space to ensure sufficient spatial isolation between a transmit panel/array and a receive panel/array. For example, FIG. 5 shows example placements of transmit panels/arrays and receive panels/arrays on vehicles to reduce self-interference (shown as "SI"). In addition, self-interference may be further reduced by larger beamforming gain provided by increasing the quantity of antenna elements per panel/array (e.g., in FR2, or higher frequencies, which may be referred to as FRx).

As indicated above, FIG. 5 is provided as an example. Other examples may differ from what is described with respect to FIG. 5.

Figure 6:
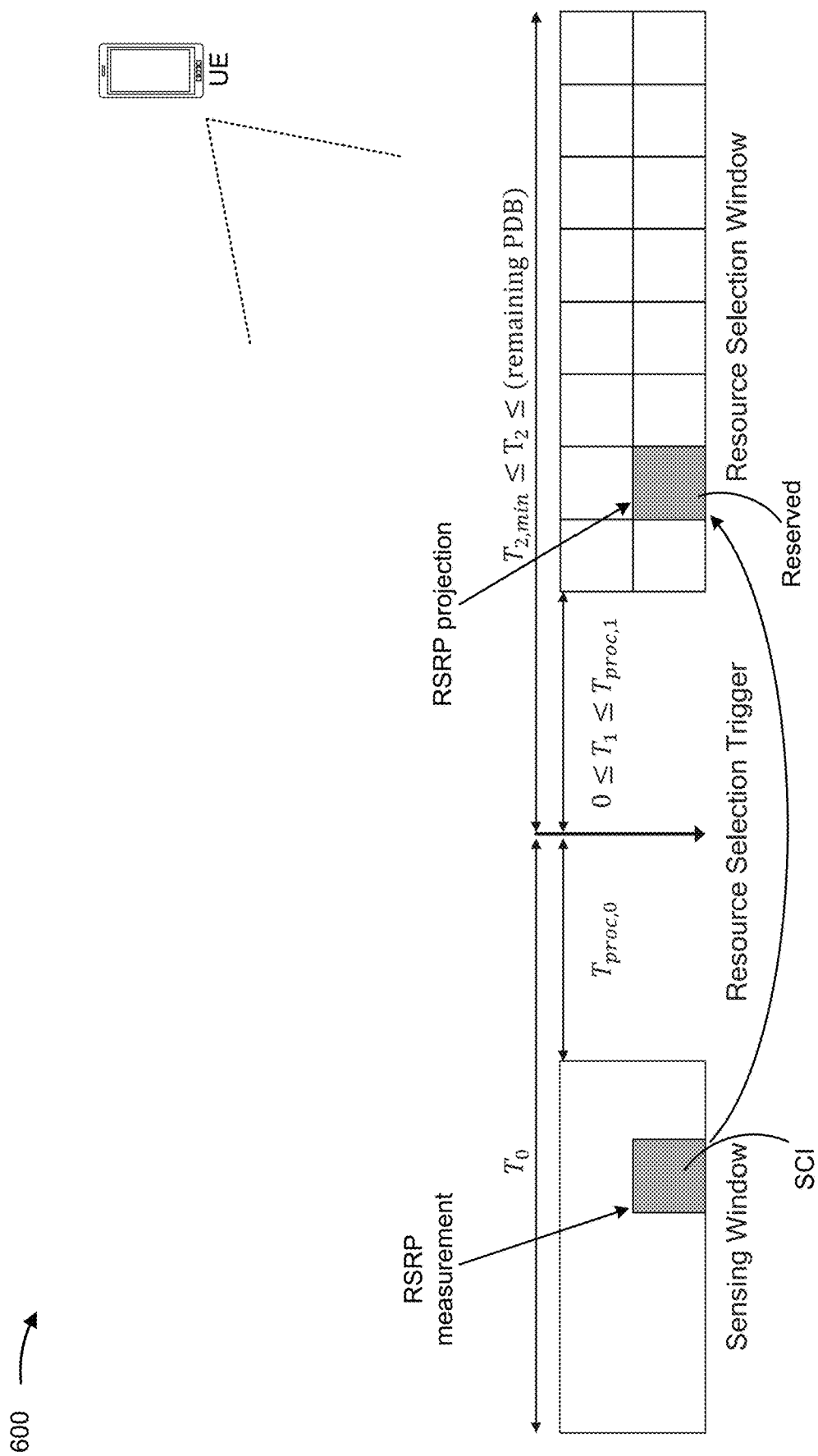
FIG. 6 is a diagram illustrating an example of sidelink sensing, in accordance with the present disclosure.

FIG. 6 is a diagram illustrating an example 600 of sidelink sensing, in accordance with the present disclosure. As shown in FIG. 6, a UE (e.g., a UE 120) may use a sensing procedure to select resources for sidelink communication, such as described in connection with FIG. 3.

As shown in FIG. 6, a UE may perform a sensing procedure in a sensing window. A size $T_0$ of the sensing window may be configured for the UE. In some cases, the sensing window may be 100 ms (e.g., for aperiodic resource reservation) or 1100 ms (e.g., for periodic resource reservation). In NR sidelink, a UE may use a sensing procedure for aperiodic or periodic resource reservation.

According to the sensing procedure, the UE may decode control messages (shown as SCI) relating to resource reservations of other UEs, as well as perform measurements (e.g., RSRP measurements) of one or more sidelink channels (e.g., one or more sub-channels associated with the resource reservations). The UE may perform the measurements in the sensing window. As shown, the sensing window may include a processing time $T_{proc,0}$ following the measurements. The measurements (e.g., RSRP measurements) in the sensing window may be projected onto the resource reservations in the resource selection window, as shown.

As shown in FIG. 6, the UE may determine to select resources for a sidelink communication based at least in part on a resource selection trigger. For example, resource selection may be triggered when the UE has a packet that is to be transmitted. Based at least in part on the resource selection trigger, the UE may determine one or more resources that are available for selection in the resource selection window. That is, the UE may determine the one or more available resources based at least in part on the sensing procedure performed by the UE (e.g., based at least in part on the measurements performed by the UE in the sensing window). For example, the sensing procedure may provide an indication of resources in the resource selection window that are occupied and/or resources in the resource selection window associated with high interference. In some examples, the UE may compare the measurements projected onto the resource selection window with a threshold (e.g., a pre-configured RSRP threshold). The threshold may be based on a priority of the transport block for which the UE is selecting resources and/or a priority indicated in control messages (e.g., SCI) detected by the UE. The UE may determine that resources associated with measurements above the threshold are occupied, and therefore the UE may exclude such resources from selection. For example, if SCI (e.g., SCI-1) detected in the sensing window is associated with an RSRP above a threshold, the UE may exclude one or more resources reserved by the SCI.

A size $T_2$ of the resource selection window may be greater than or equal to a time $T_{2,min}$, which may have a value configured for the UE based at least in part on a priority of the UE, and less than or equal to a remaining packet delay budget (PDB) of the UE. The resource selection window may also include a time period $T_1$, which may have a value from 0 to a processing time $T_{proc,1}$.

In some cases, a UE may be capable of full duplex communication. That is, the UE may be capable of transmitting and receiving at the same time (e.g., in fully or partially overlapping time intervals). However, in sidelink communication, if a UE detects SCI in the sensing window having an RSRP above a threshold, the UE does not reuse the resource(s) reserved by the SCI, even if the UE is capable of full duplex communication (e.g., even if a transmission of the UE would not affect reception by the UE in the resource(s)). As a result, the full duplex communication capability of the UE is not fully exploited and network resources are utilized inefficiently, thereby reducing throughput, increasing latency, or the like.

Some techniques and apparatuses described herein enable a first UE to provide an indication that one or more resources reserved by the first UE for a sidelink transmission may be used by a second UE for a transmission for full duplex communication. For example, the first UE may transmit SCI (e.g., SCI-1) and a PSSCH communication in a PSCCH resource, and the SCI may reserve one or more additional PSSCH resources. Continuing with the example, the first UE may indicate (e.g., to the second UE) whether reuse of the one or more additional resources is allowed for full duplex communication. In some aspects, the first UE may provide the indication if the traffic transmitted by the first UE can tolerate an increase of latency and/or a reliability loss. Additionally, or alternatively, the first UE may provide the indication if reuse of the additional resource(s) would lead to bi-directional full duplex communication (e.g., if such full duplex communication is currently feasible at the first UE).

Furthermore, the second UE receiving the indication may determine whether to reuse any of the additional resources for full duplex communication. For example, the second UE may determine to reuse the additional resource(s) if a condition is satisfied (e.g., if an interference level caused by reuse of a resource is less than a threshold). Accordingly, the second UE may transmit SCI (e.g., SCI-1) and a PSSCH communication in a first additional resource reserved by the first UE. Additionally, the SCI may reserve a second additional resource reserved by the first UE as an additional resource for the second UE. In this way, the reuse of reserved resources is determined by the first UE and the second UE in a distributed manner. By enabling and reusing a reserved resource for full duplex communication, the first UE and/or the second UE may fully exploit a full duplex communication capability, thereby improving the efficiency of network resource utilization, increasing throughput, and/or reducing latency, among other examples.

As indicated above, FIG. 6 is provided as an example. Other examples may differ from what is described with respect to FIG. 6.

Figure 7:
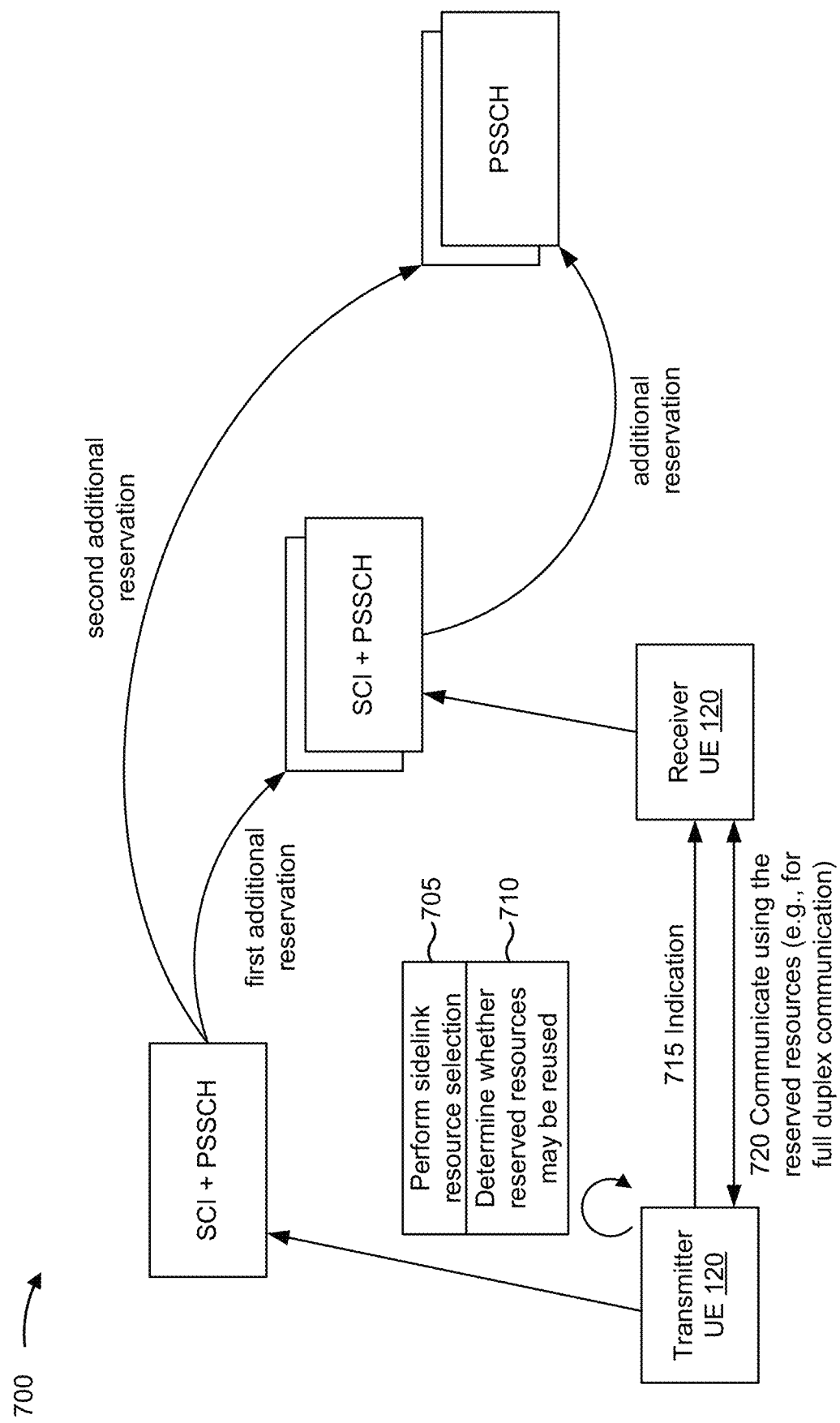
FIGS. 7-9 are diagrams illustrating examples associated with indicating full duplex use of reserved sidelink resources, in accordance with the present disclosure.

FIG. 7 is a diagram illustrating an example 700 associated with indicating full duplex use of reserved sidelink resources, in accordance with the present disclosure. As shown in FIG. 7, multiple UEs 120, such as a transmitter UE 120 and a receiver UE 120, may communicate with one another (e.g., via one or more sidelinks). In some aspects, the transmitter UE 120 and the receiver UE 120 may both be capable of full duplex communication. As used herein, the term "transmitter UE" is used to describe a UE that schedules transmission of a particular sidelink communication and transmits the particular sidelink communication to a receiver UE. As used herein, the term "receiver UE" is used to describe a UE that receives the particular sidelink communication from the transmitter UE. A single UE may be capable of operating as a transmitter UE (e.g., that transmits sidelink communications to other UEs) and a receiver UE (e.g., that receives sidelink communications from other UEs).

As shown by reference number 705, the transmitter UE 120 may perform sidelink resource selection. For example, the transmitter UE 120 may select a plurality of resources for a sidelink transmission (e.g., using a sensing procedure), as described in connection with FIGS. 3 and 6. For example, the plurality of resources may include a resource in a current time interval (e.g., a current slot) and one or more resources (e.g., two resources) that are reserved for the sidelink transmission in one or more future time intervals (e.g., future slots). In particular, the one or more reserved resources may be for a retransmission of the sidelink transmission. Based at least in part on selecting the plurality of resources, as shown, the transmitter UE 120 may transmit SCI (e.g., SCI-1) and a PSSCH communication in a sidelink resource (e.g., in a current slot), and the SCI may include one or more additional sidelink resource reservations (shown as "first additional reservation" and "second additional reservation").

As shown by reference number 710, the transmitter UE 120 may determine whether the one or more reserved resources (e.g., the first additional reservation and/or the second additional reservation) may be used (e.g., reused) by a receiver UE 120. For example, the transmitter UE 120 may determine whether the one or more reserved resources may be used by a receiver UE 120 in order to facilitate full duplex communication. In some aspects, the transmitter UE 120 may determine that the one or more reserved resources may be used by a receiver UE 120 if one or more conditions are satisfied.

In some aspects, the transmitter UE 120 may determine that the one or more reserved resources may be used by a receiver UE 120 if the sidelink transmission is associated with a particular traffic type (e.g., a traffic type that can tolerate a latency increase and/or a reliability loss). As an example, if the traffic type is enhanced mobile broadband (eMBB), then the transmitter UE 120 may determine that the one or more reserved resources may be used by a receiver UE 120; whereas, if the traffic type is ultra-reliable low latency communication (URLLC), then the transmitter UE 120 may determine that the one or more reserved resources may not be used by a receiver UE 120. Additionally, or alternatively, the transmitter UE 120 may determine that the one or more reserved resources may be used by a receiver UE 120 if use of the one or more reserved resources by the receiver UE 120 is to result in bi-directional, full duplex communication between the transmitter UE 120 and the receiver UE 120, and if full duplex communication in the one or more resources is feasible at the transmitter UE 120. For example, full duplex communication may be feasible at the transmitter UE 120 if a level of self-interference between transmit and receive beams at the transmitter UE 120 is small (e.g., below a threshold).

As shown by reference number 715, the transmitter UE 120 may transmit, and a receiver UE 120 (e.g., a plurality of receiver UEs 120) may receive, an indication that the one or more reserved resources (e.g., reserved by the transmitter UE 120 for the sidelink transmission) may be used (e.g., reused) by the receiver UE 120 (e.g., may be used by a UE 120 other than the transmitter UE 120) for a transmission for full duplex communication. That is, the one or more reserved resources that may be used for the transmission of the receiver UE 120 may be sidelink resources that are reserved by the transmitter UE 120 in the one or more future time intervals (e.g., the first additional reservation and the second additional reservation). In some aspects, the transmitter UE 120 may transmit the indication based at least in part on determining the satisfaction of one or more conditions for use of the one or more reserved resources by a receiver UE 120, as described herein. In some aspects, the indication may indicate whether use of the one or more reserved resources by the receiver UE 120 is allowed for any of the one or more reserved resources or is allowed only for a subset (e.g., a proper subset) of the one or more reserved resources.

In some aspects, the indication may be explicitly indicated (e.g., using signaling dedicated for indicating whether reserved resources may be reused). For example, the indication may be explicitly indicated in first stage SCI (e.g., in which the transmitter UE 120 also indicates the reservation of the one or more reserved resources), second stage SCI, DCI, a medium access control control element (MAC-CE), and/or RRC signaling (e.g., sidelink RRC signaling). In some aspects, the indication may be implicitly indicated by signaling that is used for a purpose other than indicating that the one or more reserved resources may be used by the receiver UE 120 (e.g., existing signaling may be repurposed for providing the indication). For example, signaling for indicating a full duplex communication capability of a UE 120 may also implicitly indicate that the one or more reserved resources may be reused by the receiver UE 120. In particular, the transmitter UE 120 transmitting information indicating that the transmitter UE 120 has a full duplex communication capability and/or the receiver UE 120 transmitting information indicating that the receiver UE 120 has a full duplex communication capability may imply that resources reserved by the transmitter UE 120 may be reused by the receiver UE 120 for a transmission.

In some aspects, the indication may indicate one or more transmission parameters (e.g., operation parameters) for the transmission of the receiver UE 120 in the one or more reserved resources. The transmission parameters may be common to (e.g., applicable to) all receiver UEs 120 that may use the one or more reserved resources for a transmission. Alternatively, the transmission parameters may be specific to the receiver UE 120 (e.g., the transmission parameters may be UE-specific). The one or more transmission parameters may indicate (e.g., for the transmission of the receiver UE 120) a transmit beam, a transmit power, an MCS, a quantity of transmission layers, time resources, of the one or more reserved resources, that are allowed for use, and/or frequency resources, of the one or more reserved resources, that are allowed for use. Indicating the transmit beam, for example, may facilitate minimizing self-interference, at least at the transmitter UE 120, in the case of bi-directional full duplex communication between the transmitter UE 120 and the receiver UE 120. For example, the transmitter UE 120 may reserve resources for transmission via a first beam pair link, and the indication may indicate that the reserved resources may be used by the receiver UE 120 for transmission via a second beam pair link (e.g., where a transmit beam of the first beam pair link and a receive beam of the second beam pair link are associated with small self-interference at the transmitter UE 120).

In some aspects, the indication may indicate one or more particular UEs 120 (e.g., the receiver UE 120) that are allowed to use the one or more reserved resources. For example, the indication may indicate that any UE 120 is allowed to use the one or more reserved resources. As another example, the indication may indicate a set of UEs 120 that are allowed to use the one or more reserved resources. The indication may indicate the set of UEs explicitly, for example, using UE identifiers. In some aspects, the set of UEs may be determined (e.g., by a receiver UE 120) based at least in part on an implicit rule (e.g., the set of UEs may include only UEs that are capable of full duplex communication).

In some aspects, the indication may indicate one or more conditions that are to be satisfied for use of the one or more reserved resources. The conditions may be common to (e.g., applicable to) all receiver UEs 120 that may use the one or more reserved resources for a transmission. Alternatively, the conditions may be specific to the receiver UE 120 (e.g., the conditions may be UE-specific). As an example, a condition may be that an interference level, to be caused at the receiver UE 120 by use of the one or more reserved resources, is below a threshold.

In some aspects, the indication may indicate one or more particular resources, of the one or more reserved resources, that may be used by the receiver UE 120. For example, the indication may indicate that a first (e.g., in time) resource reservation (e.g., the first additional reservation) may be used, but that a second (e.g., in time) resource reservation (e.g., the second additional reservation) may not be used (e.g., to protect the last retransmission opportunity of the transmitter UE 120).

In some aspects, the receiver UE 120 may receive information indicating the transmission parameters for a transmission in the reserved resources, the one or more particular UEs 120 that are allowed to use the reserved resources, the one or more conditions that are to be satisfied for use of the reserved resources, and/or the one or more particular resources that may be used, from a node other than the transmitter UE 120 (e.g., from another UE 120). In some aspects, such information may be configured for the receiver UE 120, or otherwise provisioned for the receiver UE 120 (e.g., in accordance with a specification that defines such information). In some aspects, the indication and information indicating the transmission parameters for a transmission in the reserved resources, the one or more particular UEs 120 that are allowed to use the reserved resources, the one or more conditions that are to be satisfied for use of the reserved resources, and/or the one or more particular resources that may be used may be in the same message or in different messages (e.g., in one or more of SCI-1, SCI-2, DCI, a MAC-CE, or RRC signaling).

In some aspects, the receiver UE 120 may determine whether to use the one or more reserved resources. For example, the receiver UE 120 may determine to use the one or more reserved resources if an interference level (e.g., a self-interference level) that is to be caused by use of the one or more reserved resources is below a threshold.

In some examples, the one or more reserved resources may be reserved by the transmitter UE 120 and by at least one other UE 120. For example, the transmitter UE 120 and the at least one other UE 120 both may transmit SCI indicating a reservation of the one or more reserved resources (e.g., the first additional reservation and the second additional reservation). Here, the transmitter UE 120 may transmit the indication that the one or more reserved resources may be used by the receiver UE 120, as described herein, and the at least one other UE 120 may transmit an indication that the one or more reserved resources may be used by the receiver UE 120, may transmit an indication that the one or more reserved resources may not be used by the receiver UE 120, or may not transmit an indication regarding use of the one or more reserved resources by the receiver UE 120 (e.g., if the at least one other UE 120 is a legacy UE).

In some aspects, the receiver UE 120 may determine whether respective conditions for using the one or more reserved resources, associated with each UE reserving the resources (e.g., the transmitter UE 120 and the at least one other UE 120), are satisfied. In some aspects, the receiver UE 120 may use the one or more reserved resources for the transmission if all of the respective conditions are satisfied. In some aspects, the receiver UE 120 may use the one or more reserved resources for the transmission if at least one of the respective conditions is satisfied (e.g., the receiver UE 120 may use the one or more reserved resources if the condition associated with the transmitter UE 120 is satisfied, even if the condition associated with the at least one other UE 120 is not satisfied).

In connection with a UE (e.g., the transmitter UE 120) that reserved the one or more reserved resources and indicated that the one or more reserved resources may be used by the receiver UE 120, a condition for using the one or more reserved resources may be as described above. For example, in connection with a UE (e.g., the transmitter UE 120) that reserved the one or more resources and indicated that the one or more resources may be used by the receiver UE 120, a condition for using the one or more reserved resources may be that an interference level (e.g., at the receiver UE 120) that is to be caused by use of the one or more reserved resources (e.g., by the receiver UE 120) is below a threshold. In other words, a legacy condition for resource selection (e.g., in connection with a sensing procedure, as described herein) may be ignored in connection with the UE that indicated that the one or more reserved resources may be used by the receiver UE 120. Additionally, or alternatively, a condition may be that a self-interference level caused by use of the one or more reserved resources is below a threshold.

In connection with a UE (e.g., the at least one other UE 120) that reserved the one or more reserved resources and did not indicate that the one or more reserved resources may be used by the receiver UE 120 (e.g., indicated that the reserved resources may not be used by the receiver UE 120 or did not provide an indication), a condition for using the one or more reserved resources may be a legacy condition for resource selection (e.g., in connection with a sensing procedure, as described herein). For example, in connection with a UE (e.g., the at least one other UE 120) that reserved the one or more reserved resources and did not indicate that the one or more reserved resources may be used by the receiver UE 120 (e.g., indicated that the reserved resources may not be used by the receiver UE 120 or did not provide an indication), a condition for using the one or more reserved resources may be that a signal strength (e.g., a sensed RSRP) associated with SCI (e.g., transmitted by the UE) that indicated reservation of the one or more reserved resources is below a threshold. Additionally, or alternatively, a condition may be that a self-interference level caused by use of the one or more reserved resources is below a threshold.

As shown by reference number 720, the receiver UE 120 may communicate on a sidelink using the one or more reserved resources reserved by the transmitter UE 120. That is, the receiver UE 120 may perform the transmission for full duplex communication in the one or more reserved resources, as described herein. As shown, the receiver UE 120 may transmit SCI (e.g., SCI-1) and a PSSCH communication in a reserved resource (e.g., in the first additional reservation of the transmitter UE 120), and the SCI may include one or more additional sidelink resource reservations (shown as "additional reservation"). The additional reservation of the receiver UE 120 may be the second additional reservation of the transmitter UE 120 to facilitate further full duplex communication.

The receiver UE 120 may communicate using the one or more reserved resources based at least in part on the indication. For example, the receiver UE 120 may communicate using the one or more reserved resources based at least in part on the indication indicating that the one or more reserved resources may be used by the receiver UE 120. Furthermore, the receiver UE 120 may communicate using the one or more reserved resources in accordance with information indicating the transmission parameters for a transmission in the reserved resources, the one or more particular UEs 120 that are allowed to use the reserved resources, the one or more conditions that are to be satisfied for use of the reserved resources, and/or the one or more particular resources that may be used, as described herein.

In some aspects, the receiver UE 120 may use the one or more reserved resources to perform the transmission to the transmitter UE 120 in the same time interval in which the transmitter UE 120 is performing the sidelink transmission to the receiver UE 120. That is, the receiver UE 120 may use the one or more reserved resources for bi-directional full duplex communication with transmitter UE 120. In some aspects, the receiver UE 120 may use the one or more reserved resources to perform the transmission to another UE 120 in the same time interval in which the transmitter UE 120 is performing the sidelink transmission to the receiver UE 120. That is, the receiver UE 120 may use the one or more reserved resources for full duplex communication with the transmitter UE 120 and the other UE 120. By enabling full duplex communication, the indication facilitates efficient utilization of network resources.

As indicated above, FIG. 7 is provided as an example. Other examples may differ from what is described with respect to FIG. 7.

Figure 8:
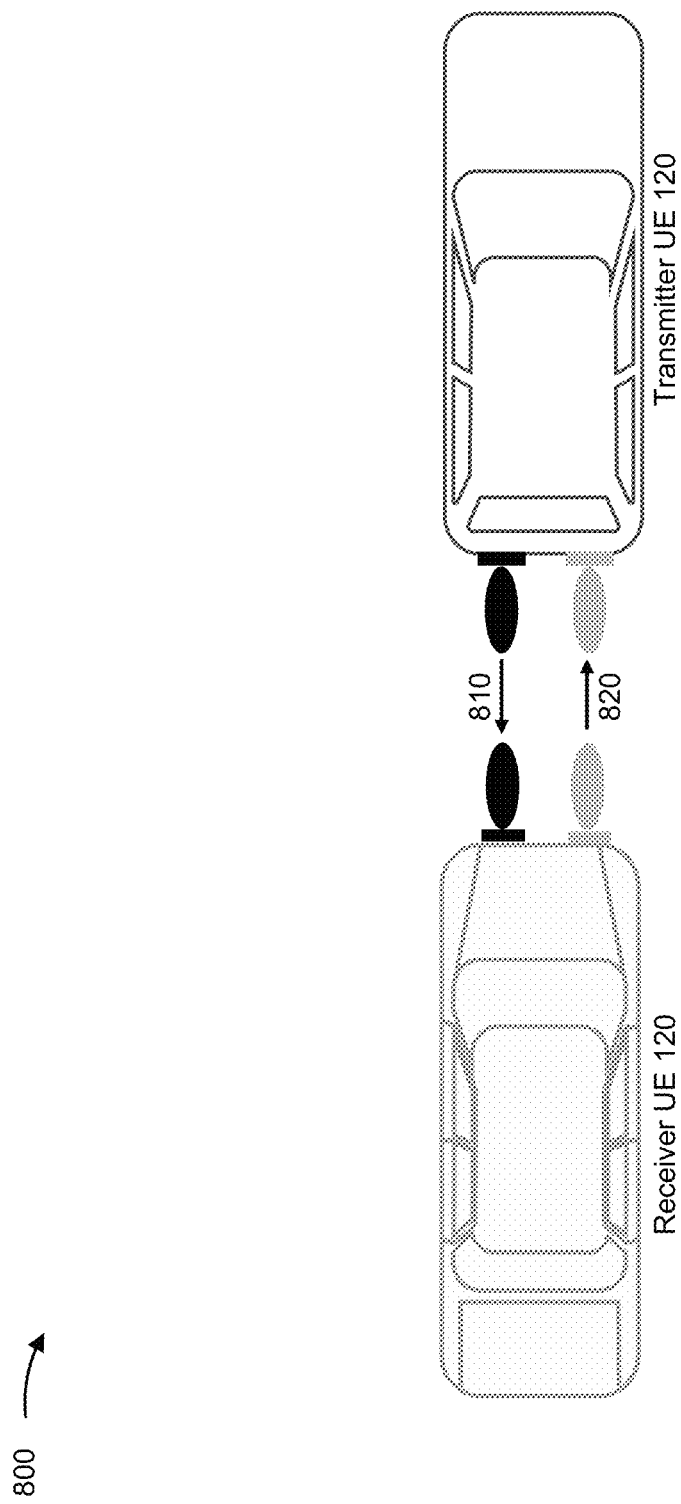

FIG. 8 is a diagram illustrating an example 800 associated with indicating full duplex use of reserved sidelink resources, in accordance with the present disclosure. As shown in FIG. 8, multiple UEs 120, such as a transmitter UE 120 and a receiver UE 120, may communicate with one another (e.g., via one or more sidelinks). Example 800 illustrates bi-directional full duplex communication between the transmitter UE 120 and the receiver UE 120 when full duplex communication is feasible at the transmitter UE 120 and the receiver UE 120.

The transmitter UE 120 may transmit first stage SCI that reserves one or more resources (e.g., two future resources) for sidelink transmission (e.g., data transmission) to the receiver UE 120 via a first (e.g., primary) beam pair link 810. In addition, the transmitter UE 120 may transmit an indication (e.g., in the first stage SCI or in second stage SCI) that the receiver UE 120 may use the one or more reserved resources (e.g., for full duplex communication) via a second (e.g., secondary) beam pair link 820. The receiver UE 120 may use the one or more reserved resources if a self-interference level at the receiver UE 120 that is to be caused by reception on the first beam pair link 810 (e.g., on a receive beam of the first beam pair link 810) and transmission on the second beam pair link 820 (e.g., on a transmit beam of the second beam pair link 820) is below a threshold. In some aspects, the receiver UE 120 may determine the self-interference level based at least in part on previous traffic (e.g., previous traffic using the first beam pair link 810 and the second beam pair link 820). In some aspects, the receiver UE 120 may determine the self-interference level using a self-training reference signal (e.g., by performing measurement of the self-training reference signal).

Thus, relative to semi-static signaling (e.g., RRC signaling), the indication (e.g., which is indicated dynamically, such as in SCI) enables the transmitter UE 120 to indicate that full duplex communication is allowed only when the self-interference level, at least at the transmitter UE 120, with respect to a transmit beam of the first beam pair link 810 and a receive beam of the second beam pair link 820, is currently small (e.g., below a threshold).

As indicated above, FIG. 8 is provided as an example. Other examples may differ from what is described with respect to FIG. 8.

Figure 9:
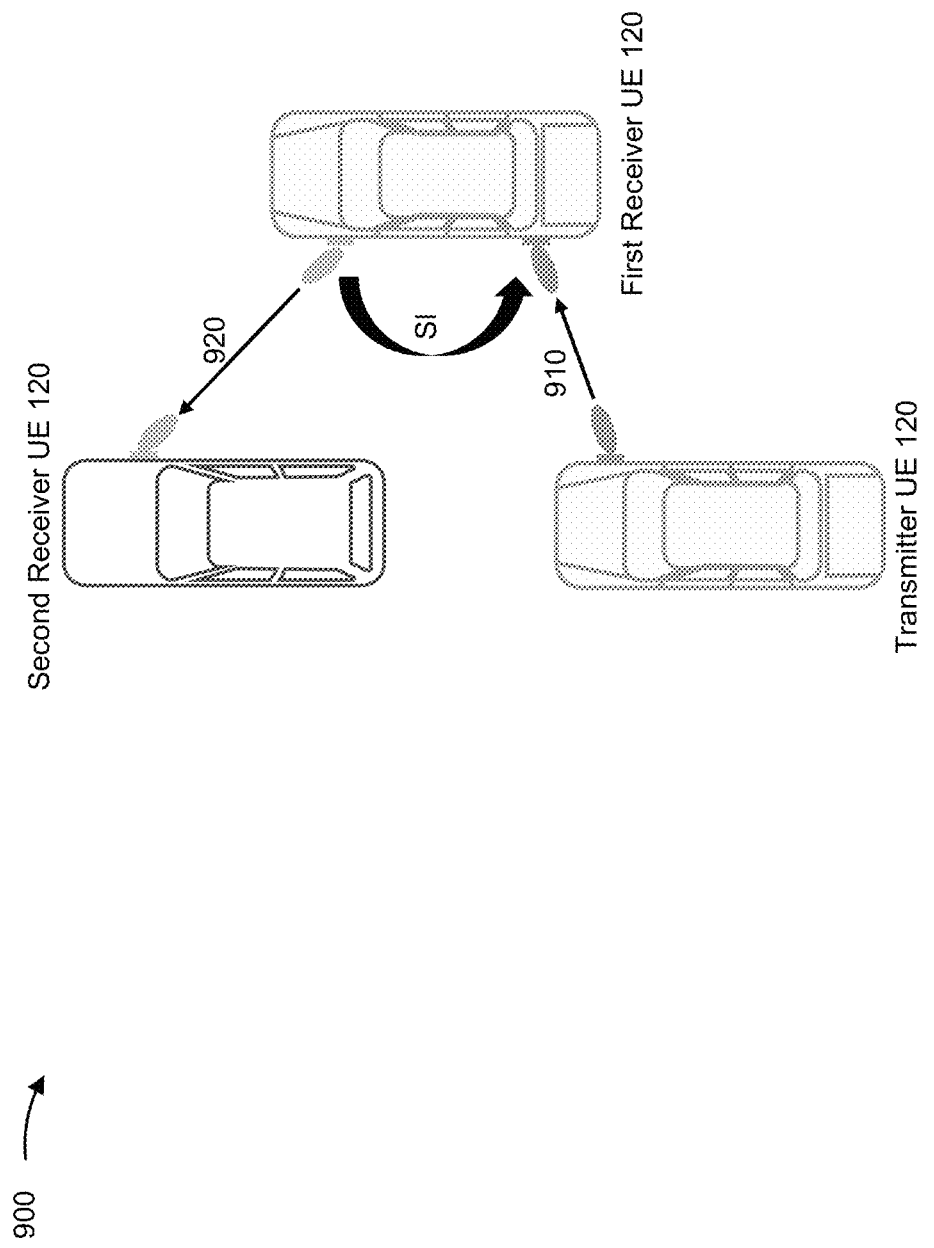

FIG. 9 is a diagram illustrating an example 900 associated with indicating full duplex use of reserved sidelink resources, in accordance with the present disclosure. As shown in FIG. 9, multiple UEs 120, such as a transmitter UE 120, a first receiver UE 120, and a second receiver UE 120, may communicate with one another (e.g., via one or more sidelinks). Example 900 illustrates opportunistic reuse of reserved resources when full duplex communication is feasible at the first receiver UE 120.

The transmitter UE 120 may transmit first stage SCI that reserves one or more resources (e.g., two future resources) for sidelink transmission (e.g., data transmission) to the first receiver UE 120 via a first (e.g., primary) beam pair link 910. In addition, the transmitter UE 120 may transmit an indication (e.g., in the first stage SCI or in second stage SCI) that the first receiver UE 120 may use the one or more reserved resources (e.g., for full duplex communication) for a transmission (e.g., to the second receiver UE 120). The first receiver UE 120 (e.g., which in this scenario may also be considered a secondary transmitter UE) may use the one or more reserved resources for the transmission if a self-interference level at the first receiver UE 120 that is to be caused by reception on the first beam pair link 910 (e.g., on a receive beam of the first beam pair link 910) and transmission on a second beam pair link 920 (e.g., on a transmit beam of the second beam pair link 920) is below a threshold. In some aspects, the transmitter UE 120 may indicate the receive beam of the first beam pair link 910 that is to be used by the first receiver UE 120. In some aspects, the first receiver UE 120 may select the transmit beam of the second beam pair link 920 that is to be used by the first receiver UE 120.

Thus, relative to semi-static signaling (e.g., RRC signaling), the indication (e.g., which is indicated dynamically, such as in SCI) enables the transmitter UE 120 to indicate that full duplex communication is allowed only when current traffic over the first beam pair link 910 can tolerate increased latency and/or reliability loss.

As indicated above, FIG. 9 is provided as an example. Other examples may differ from what is described with respect to FIG. 9.

Figure 10:
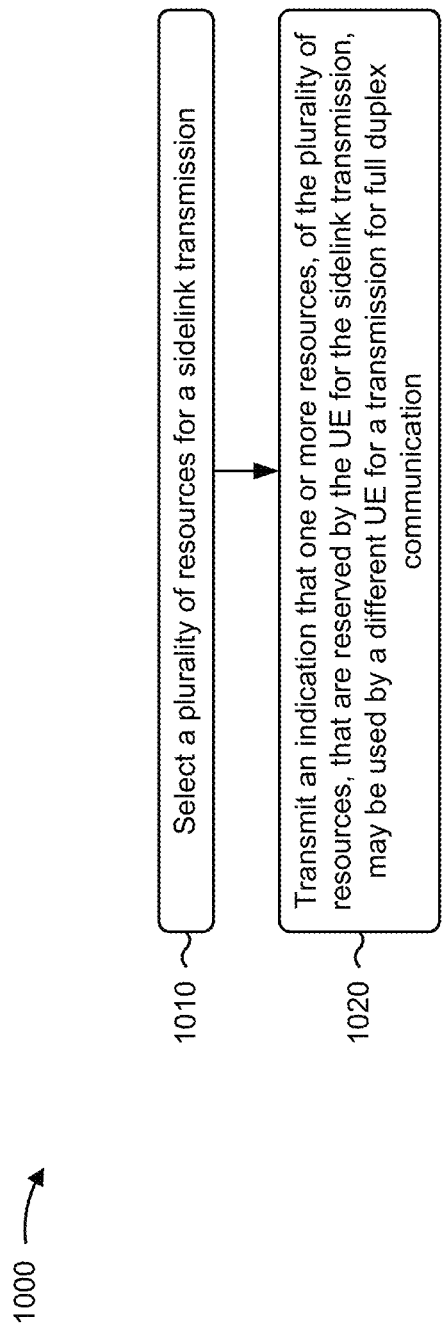
FIGS. 10-11 are diagrams illustrating examples associated with indicating full duplex use of reserved sidelink resources, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with indicating full duplex use of reserved sidelink resources.

As shown in FIG. 10, in some aspects, process 1000 may include selecting a plurality of resources for a sidelink transmission (block 1010). For example, the UE (e.g., using communication manager 140 and/or determination component 1208, depicted in FIG. 12) may select a plurality of resources for a sidelink transmission, as described above.

As further shown in FIG. 10, in some aspects, process 1000 may include transmitting an indication that one or more resources, of the plurality of resources, that are reserved by the UE for the sidelink transmission, may be used by a different UE for a transmission for full duplex communication (block 1020). For example, the UE (e.g., using communication manager 140 and/or transmission component 1204, depicted in FIG. 12) may transmit an indication that one or more resources, of the plurality of resources, that are reserved by the UE for the sidelink transmission, may be used by a different UE for a transmission for full duplex communication, as described above.

Process 1000 may include additional aspects, such as any single aspect or any combination of aspects described below and/or in connection with one or more other processes described elsewhere herein.

In a first aspect, the indication is transmitted if the sidelink transmission is associated with a particular traffic type.

In a second aspect, alone or in combination with the first aspect, the indication is transmitted if full duplex communication in the one or more resources is feasible at the UE, and using of the one or more resources by the different UE is to result in full duplex communication between the UE and the different UE.

In a third aspect, alone or in combination with one or more of the first and second aspects, the indication is explicitly indicated in one or more of SCI, DCI, a MAC-CE, or RRC signaling.

In a fourth aspect, alone or in combination with one or more of the first through third aspects, the indication is implicitly indicated by signaling that is used for a purpose other than indicating that the one or more resources may be used by the different UE for the transmission.

In a fifth aspect, alone or in combination with one or more of the first through fourth aspects, the indication indicates one or more transmission parameters for the transmission.

In a sixth aspect, alone or in combination with one or more of the first through fifth aspects, the one or more transmission parameters indicate at least a transmit beam, a transmit power, a modulation and coding scheme, a quantity of transmission layers, time resources, of the one or more resources, that are allowed for use, or frequency resources, of the one or more resources, that are allowed for use.

In a seventh aspect, alone or in combination with one or more of the first through sixth aspects, the indication indicates one or more particular UEs that are allowed to use the one or more resources.

In an eighth aspect, alone or in combination with one or more of the first through seventh aspects, the indication indicates one or more conditions that are to be satisfied for use of the one or more resources.

In a ninth aspect, alone or in combination with one or more of the first through eighth aspects, the indication indicates one or more particular resources of the one or more resources that may be used by the different UE for the transmission.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
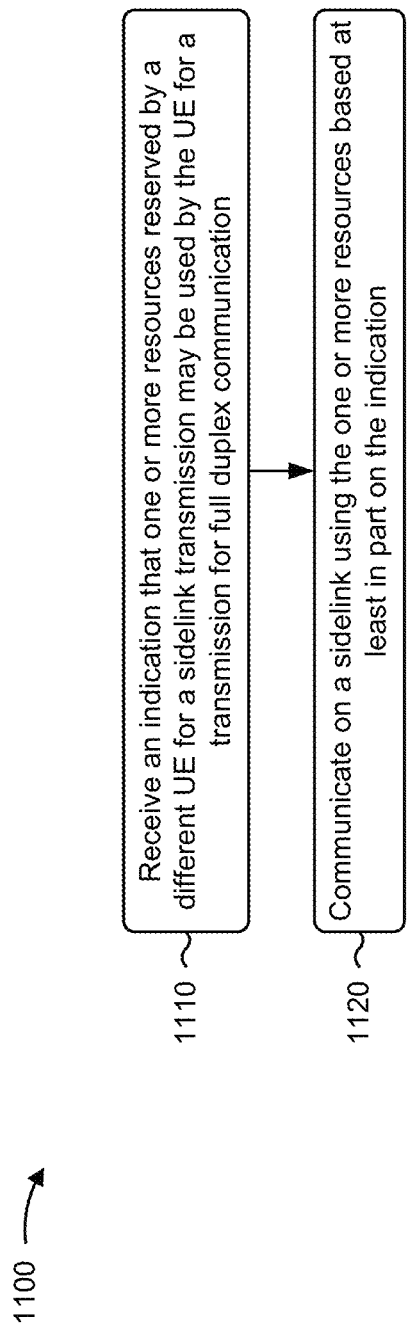

FIG. 11 is a diagram illustrating an example process 1100 performed, for example, by a UE, in accordance with the present disclosure. Example process 1100 is an example where the UE (e.g., UE 120) performs operations associated with indicating full duplex use of reserved sidelink resources.

As shown in FIG. 11, in some aspects, process 1100 may include receiving an indication that one or more resources reserved by a different UE for a sidelink transmission may be used by the UE for a transmission for full duplex communication (block 1110). For example, the UE (e.g., using communication manager 140 and/or reception component 1202, depicted in FIG. 12) may receive an indication that one or more resources reserved by a different UE for a sidelink transmission may be used by the UE for a transmission for full duplex communication, as described above.

As further shown in FIG. 11, in some aspects, process 1100 may include communicating on a sidelink using the one or more resources based at least in part on the indication (block 1120). For example, the UE (e.g., using communication manager 140, reception component 1202, and/or transmission component 1204, depicted in FIG. 12) may communicate on a sidelink using the one or more resources based at least in part on the indication, as described above.

Process 1100 may include additional aspects, such as any single aspect or any combination of aspects described below and/or in connection with one or more other processes described elsewhere herein.

In a first aspect, the indication is received if the sidelink transmission is associated with a particular traffic type.

In a second aspect, alone or in combination with the first aspect, the indication is received if full duplex communication in the one or more resources is feasible at the different UE, and using of the one or more resources by the UE is to result in full duplex communication between the UE and the different UE.

In a third aspect, alone or in combination with one or more of the first and second aspects, the indication is explicitly indicated in one or more of SCI, DCI, a MAC-CE, or RRC signaling.

In a fourth aspect, alone or in combination with one or more of the first through third aspects, the indication is implicitly indicated by signaling that is used for a purpose other than indicating that the one or more resources may be used by the UE for the transmission.

In a fifth aspect, alone or in combination with one or more of the first through fourth aspects, the indication indicates one or more transmission parameters for the transmission.

In a sixth aspect, alone or in combination with one or more of the first through fifth aspects, the one or more transmission parameters indicate at least a transmit beam, a transmit power, a modulation and coding scheme, a quantity of transmission layers, time resources, of the one or more resources, that are allowed for use, or frequency resources, of the one or more resources, that are allowed for use.

In a seventh aspect, alone or in combination with one or more of the first through sixth aspects, the indication indicates one or more particular UEs that are allowed to use the one or more resources.

In an eighth aspect, alone or in combination with one or more of the first through seventh aspects, the indication indicates one or more conditions that are to be satisfied for use of the one or more resources.

In a ninth aspect, alone or in combination with one or more of the first through eighth aspects, the indication indicates one or more particular resources of the one or more resources that may be used by the UE for the transmission.

In a tenth aspect, alone or in combination with one or more of the first through ninth aspects, the one or more resources are reserved by the different UE and at least one other UE, and the one or more resources are used by the UE for the transmission if all respective conditions for using the one or more resources, associated with the different UE and the at least one other UE, are satisfied.

In an eleventh aspect, alone or in combination with one or more of the first through tenth aspects, the one or more resources are reserved by the different UE and at least one other UE, and the one or more resources are used by the UE for the transmission if at least one of respective conditions for using the one or more resources, associated with the different UE and the at least one other UE, is satisfied.

In a twelfth aspect, alone or in combination with one or more of the first through eleventh aspects, a condition for using the one or more resources, associated with any UE that reserved the one or more resources and that indicated that the one or more resources may be used by the UE, is that an interference level that is to be caused by use of the one or more resources is below a threshold.

In a thirteenth aspect, alone or in combination with one or more of the first through twelfth aspects, a condition for using the one or more resources, associated with any UE that reserved the one or more resources and that did not indicate that the one or more resources may be used by the UE, is that a signal strength associated with sidelink control information that indicated reservation of the one or more resources is below a threshold.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
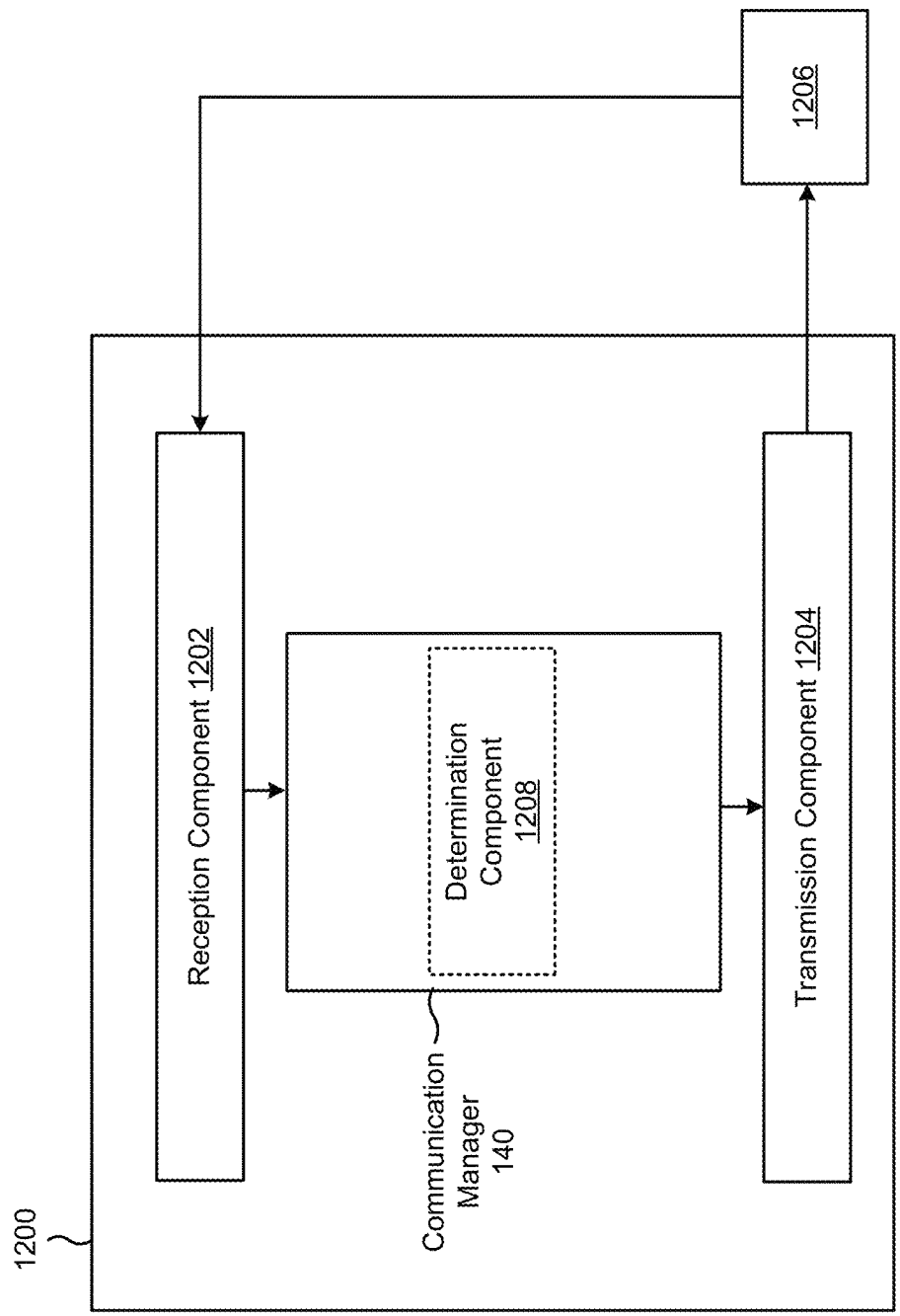
FIG. 12 is a diagram of an example apparatus for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a determination component 1208, among other examples.

In some aspects, the apparatus 1200 may be configured to perform one or more operations described herein in connection with FIGS. 7-9. Additionally, or alternatively, the apparatus 1200 may be configured to perform one or more processes described herein, such as process 1000 of FIG. 10, process 1100 of FIG. 11, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The determination component 1208 may select a plurality of resources for a sidelink transmission. The transmission component 1204 may transmit an indication that one or more resources, of the plurality of resources, that are reserved for the sidelink transmission, may be used by a different UE for a transmission for full duplex communication.

The reception component 1202 may receive an indication that one or more resources reserved by a different UE for a sidelink transmission may be used for a transmission for full duplex communication. The reception component 1202 and/or the transmission component 1204 may communicate on a sidelink using the one or more resources based at least in part on the indication. In some aspects, the determination component 1208 may determine whether a condition for reuse of the one or more resources is satisfied.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: selecting a plurality of resources for a sidelink transmission; and transmitting an indication that one or more resources, of the plurality of resources, that are reserved by the UE for the sidelink transmission, may be used by a different UE for a transmission for full duplex communication.

Aspect 2: The method of Aspect 1, wherein the indication is transmitted if the sidelink transmission is associated with a particular traffic type.

Aspect 3: The method of any of Aspects 1-2, wherein the indication is transmitted if: full duplex communication in the one or more resources is feasible at the UE, and use of the one or more resources by the different UE is to result in full duplex communication between the UE and the different UE.

Aspect 4: The method of any of Aspects 1-3, wherein the indication is explicitly indicated in one or more of sidelink control information, downlink control information, a medium access control control element (MAC-CE), or radio resource control signaling.

Aspect 5: The method of any of Aspects 1-3, wherein the indication is implicitly indicated by signaling that is used for a purpose other than indicating that the one or more resources may be used by the different UE for the transmission.

Aspect 6: The method of any of Aspects 1-5, wherein the indication indicates one or more transmission parameters for the transmission.

Aspect 7: The method of Aspect 6, wherein the one or more transmission parameters indicate at least: a transmit beam, a transmit power, a modulation and coding scheme, a quantity of transmission layers, time resources, of the one or more resources, that are allowed for use, or frequency resources, of the one or more resources, that are allowed for use.

Aspect 8: The method of any of Aspects 1-7, wherein the indication indicates one or more particular UEs that are allowed to use the one or more resources.

Aspect 9: The method of any of Aspects 1-8, wherein the indication indicates one or more conditions that are to be satisfied for use of the one or more resources.

Aspect 10: The method of any of Aspects 1-9, wherein the indication indicates one or more particular resources of the one or more resources that may be used by the different UE for the transmission.

Aspect 11: A method of wireless communication performed by a user equipment (UE), comprising: receiving an indication that one or more resources reserved by a different UE for a sidelink transmission may be used by the UE for a transmission for full duplex communication; and communicating on a sidelink using the one or more resources based at least in part on the indication.

Aspect 12: The method of Aspect 11, wherein the indication is received if the sidelink transmission is associated with a particular traffic type.

Aspect 13: The method of any of Aspects 11-12, wherein the indication is received if: full duplex communication in the one or more resources is feasible at the different UE, and use of the one or more resources by the UE is to result in full duplex communication between the UE and the different UE.

Aspect 14: The method of any of Aspects 11-13, wherein the indication is explicitly indicated in one or more of sidelink control information, downlink control information, a medium access control control element (MAC-CE), or radio resource control signaling.

Aspect 15: The method of any of Aspects 11-13, wherein the indication is implicitly indicated by signaling that is used for a purpose other than indicating that the one or more resources may be used by the UE for the transmission.

Aspect 16: The method of any of Aspects 11-15, wherein the indication indicates one or more transmission parameters for the transmission.

Aspect 17: The method of Aspect 16, wherein the one or more transmission parameters indicate at least: a transmit beam, a transmit power, a modulation and coding scheme, a quantity of transmission layers, time resources, of the one or more resources, that are allowed for use, or frequency resources, of the one or more resources, that are allowed for use.

Aspect 18: The method of any of Aspects 11-17, wherein the indication indicates one or more particular UEs that are allowed to use the one or more resources.

Aspect 19: The method of any of Aspects 11-18, wherein the indication indicates one or more conditions that are to be satisfied for use of the one or more resources.

Aspect 20: The method of any of Aspects 11-19, wherein the indication indicates one or more particular resources of the one or more resources that may be used by the UE for the transmission.

Aspect 21: The method of any of Aspects 11-20, wherein the one or more resources are reserved by the different UE and at least one other UE, and wherein the one or more resources are used by the UE for the transmission if all respective conditions for using the one or more resources, associated with the different UE and the at least one other UE, are satisfied.

Aspect 22: The method of any of Aspects 11-20, wherein the one or more resources are reserved by the different UE and at least one other UE, and wherein the one or more resources are used by the UE for the transmission if at least one of respective conditions for using the one or more resources, associated with the different UE and the at least one other UE, is satisfied.

Aspect 23: The method of any of Aspects 11-22, wherein a condition for using the one or more resources, associated with any UE that reserved the one or more resources and that indicated that the one or more resources may be used by the UE, is that an interference level that is to be caused by use of the one or more resources is below a threshold.

Aspect 24: The method of any of Aspects 11-23, wherein a condition for using the one or more resources, associated with any UE that reserved the one or more resources and that did not indicate that the one or more resources may be used by the UE, is that a signal strength associated with sidelink control information that indicated reservation of the one or more resources is below a threshold.

Aspect 25: An apparatus for wireless communication at a device, comprising a processor; memory coupled with the processor; and instructions stored in the memory and executable by the processor to cause the apparatus to perform the method of one or more of Aspects 1-10.

Aspect 26: A device for wireless communication, comprising a memory and one or more processors coupled to the memory, the one or more processors configured to perform the method of one or more of Aspects 1-10.

Aspect 27: An apparatus for wireless communication, comprising at least one means for performing the method of one or more of Aspects 1-10.

Aspect 28: A non-transitory computer-readable medium storing code for wireless communication, the code comprising instructions executable by a processor to perform the method of one or more of Aspects 1-10.

Aspect 29: A non-transitory computer-readable medium storing a set of instructions for wireless communication, the set of instructions comprising one or more instructions that, when executed by one or more processors of a device, cause the device to perform the method of one or more of Aspects 1-10.

Aspect 30: An apparatus for wireless communication at a device, comprising a processor; memory coupled with the processor; and instructions stored in the memory and executable by the processor to cause the apparatus to perform the method of one or more of Aspects 11-24.

Aspect 31: A device for wireless communication, comprising a memory and one or more processors coupled to the memory, the one or more processors configured to perform the method of one or more of Aspects 11-24.

Aspect 32: An apparatus for wireless communication, comprising at least one means for performing the method of one or more of Aspects 11-24.

Aspect 33: A non-transitory computer-readable medium storing code for wireless communication, the code comprising instructions executable by a processor to perform the method of one or more of Aspects 11-24.

Aspect 34: A non-transitory computer-readable medium storing a set of instructions for wireless communication, the set of instructions comprising one or more instructions that, when executed by one or more processors of a device, cause the device to perform the method of one or more of Aspects 11-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    one or more memories; and
    one or more processors, coupled to the one or more memories, configured to cause the UE to:
        select a plurality of resources for a sidelink transmission; and
        transmit an indication that a different UE is allowed to use one or more resources, of the plurality of resources, that are reserved by the UE for the sidelink transmission for a transmission for full duplex communication.

2. The apparatus of claim 1, wherein the indication is transmitted if the sidelink transmission is associated with a particular traffic type.

3. The apparatus of claim 1, wherein the indication is transmitted if:
    full duplex communication in the one or more resources is feasible at the UE, and use of the one or more resources by the different UE is to result in full duplex communication between the UE and the different UE.

4. The apparatus of claim 1, wherein the indication is explicitly indicated in one or more of sidelink control information, downlink control information, a medium access control control element (MAC-CE), or radio resource control signaling.

5. The apparatus of claim 1, wherein the indication is implicitly indicated by signaling that is used for a purpose other than indicating that use of the one or more resources is allowed for the transmission.

6. The apparatus of claim 1, wherein the indication indicates one or more transmission parameters for the transmission, and
wherein the one or more transmission parameters indicate at least:
a transmit beam,
a transmit power,
a modulation and coding scheme,
a quantity of transmission layers,
time resources, of the one or more resources, that are allowed for use, or
frequency resources, of the one or more resources, that are allowed for use.

7. The apparatus of claim 1, wherein the indication indicates one or more particular UEs that are allowed to use the one or more resources, and
wherein the one or more particular UEs include the different UE.

8. The apparatus of claim 1, wherein the indication indicates one or more conditions that are to be satisfied for use of the one or more resources.

9. The apparatus of claim 1, wherein the indication indicates that the one or more resources are a subset of resources reserved by the UE for the sidelink transmission.

10. An apparatus for wireless communication at a user equipment (UE), comprising:
one or more memories; and
one or more processors, coupled to the one or more memories, configured to cause the UE to:
receive an indication that the UE is allowed to use one or more resources, reserved by a different UE for a sidelink transmission, for a transmission for full duplex communication; and
communicate on a sidelink using the one or more resources based at least in part on the indication.

11. The apparatus of claim 10, wherein the indication is received if the sidelink transmission is associated with a particular traffic type.

12. The apparatus of claim 10, wherein the indication is received if:
full duplex communication in the one or more resources is feasible at the different UE, and
use of the one or more resources by the UE is to result in full duplex communication between the UE and the different UE.

13. The apparatus of claim 10, wherein the indication is explicitly indicated in one or more of sidelink control information, downlink control information, a medium access control control element (MAC-CE), or radio resource control signaling.

14. The apparatus of claim 10, wherein the indication is implicitly indicated by signaling that is used for a purpose other than indicating that use of the one or more resources is allowed for the transmission.

15. The apparatus of claim 10, wherein the indication indicates one or more transmission parameters for the transmission, and
wherein the one or more transmission parameters indicate at least:
a transmit beam,
a transmit power,
a modulation and coding scheme,
a quantity of transmission layers,
time resources, of the one or more resources, that are allowed for use, or
frequency resources, of the one or more resources, that are allowed for use.

16. The apparatus of claim 10, wherein the indication indicates one or more particular UEs that are allowed to use the one or more resources, and
wherein the one or more particular UEs include the UE.

17. The apparatus of claim 10, wherein the indication indicates one or more conditions that are to be satisfied for use of the one or more resources.

18. The apparatus of claim 10, wherein the indication indicates that the one or more resources are a subset of resources reserved by the UE for the sidelink transmission.

19. The apparatus of claim 10, wherein the one or more resources are reserved by the different UE and at least one other UE, and
wherein the one or more resources are used by the UE for the transmission if all respective conditions for using the one or more resources, associated with the different UE and the at least one other UE, are satisfied.

20. The apparatus of claim 10, wherein the one or more resources are reserved by the different UE and at least one other UE, and
wherein the one or more resources are used by the UE for the transmission if at least one of respective conditions for using the one or more resources, associated with the different UE and the at least one other UE, is satisfied.

21. The apparatus of claim 10, wherein a condition for using the one or more resources is that an interference level that is to be caused by use of the one or more resources is below a threshold.

22. The apparatus of claim 10, wherein a condition for using the one or more resources is that a signal strength associated with sidelink control information that indicated reservation of the one or more resources is below a threshold.

23. A method of wireless communication performed by an apparatus of a user equipment (UE), comprising:
selecting a plurality of resources for a sidelink transmission; and
transmitting an indication that a different UE is allowed to use one or more resources, of the plurality of resources, that are reserved by the UE for the sidelink transmission for a transmission for full duplex communication.

24. The method of claim 23, wherein the indication is transmitted if the sidelink transmission is associated with a particular traffic type.

25. The method of claim 23, wherein the indication is transmitted if:
full duplex communication in the one or more resources is feasible at the UE, and
use of the one or more resources by the different UE is to result in full duplex communication between the UE and the different UE.

26. The method of claim 23, wherein the indication indicates one or more transmission parameters for the transmission, and wherein the one or more transmission parameters indicate at least:
a transmit beam,
a transmit power,
a modulation and coding scheme,
a quantity of transmission layers,
time resources, of the one or more resources, that are allowed for use, or
frequency resources, of the one or more resources, that are allowed for use.

27. A method of wireless communication performed by an apparatus of a user equipment (UE), comprising:
receiving an indication that the UE is allowed to use one or more resources, reserved by a different UE for a sidelink transmission, for a transmission for full duplex communication; and
communicating on a sidelink using the one or more resources based at least in part on the indication.

28. The method of claim 27, wherein the indication is received if the sidelink transmission is associated with a particular traffic type.

29. The method of claim 27, wherein the indication is received if:
full duplex communication in the one or more resources is feasible at the different UE, and
use of the one or more resources by the UE is to result in full duplex communication between the UE and the different UE.

30. The method of claim 27, wherein the indication indicates one or more transmission parameters for the transmission, and
wherein the one or more transmission parameters indicate at least:
a transmit beam,
a transmit power,
a modulation and coding scheme,
a quantity of transmission layers,
time resources, of the one or more resources, that are allowed for use, or
frequency resources, of the one or more resources, that are allowed for use.

* * * * *